US011292277B2

(12) United States Patent
Mizutani

(10) Patent No.: US 11,292,277 B2
(45) Date of Patent: Apr. 5, 2022

(54) PRINTING DEVICE INCLUDING CASSETTE MOUNTING PORTION IN WHICH A PLURALITY OF TYPES OF CASSETTES IS CONFIGURED TO BE SELECTIVELY MOUNTED

(71) Applicant: BROTHER KOGYO KABUSHIKI KAISHA, Nagoya (JP)

(72) Inventor: Hiromitsu Mizutani, Ichinomiya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/082,583

(22) Filed: Oct. 28, 2020

(65) Prior Publication Data
US 2021/0129562 A1    May 6, 2021

(30) Foreign Application Priority Data

Oct. 31, 2019    (JP) .............................. JP2019-198579

(51) Int. Cl.
| | |
|---|---|
| *B41J 35/22* | (2006.01) |
| *B41J 2/325* | (2006.01) |
| *B41J 29/38* | (2006.01) |
| *G06K 7/10* | (2006.01) |
| *B41J 2/32* | (2006.01) |

(52) U.S. Cl.
CPC ................. *B41J 29/38* (2013.01); *B41J 2/32* (2013.01); *G06K 7/10366* (2013.01)

(58) Field of Classification Search
CPC ............. G06K 7/0008; G06K 17/0029; G06K 7/10366; H04W 4/80; G06F 21/44; B41J 35/22
See application file for complete search history.

(56) References Cited

U.S. PATENT DOCUMENTS

2006/0029406 A1 * 2/2006 Nagahama ......... G03G 15/0863
                                                              399/27
2008/0181708 A1   7/2008 Yamaguchi et al.
(Continued)

FOREIGN PATENT DOCUMENTS

| JP | 2005-31403 A | 2/2005 |
|---|---|---|
| JP | 2010-113258 A | 5/2010 |
| WO | 2006/033430 A1 | 5/2008 |

*Primary Examiner* — Huan H Tran
(74) *Attorney, Agent, or Firm* — Kenealy Vaidya LLP

(57) ABSTRACT

A printing device includes: an RFID reader including a reader antenna; a cassette mounting portion in which a plurality of types of cassettes can be selectively mounted; a memory storing correlations between the types of cassettes and standard ranges concerning a return energy; and a controller. Each cassette includes an RFID tag storing cassette information related to the cassette. The RFID tag includes a tag antenna configured to communicate with the reader antenna. Communication sensitivity between the reader antenna and the tag antenna when the cassette is mounted in the cassette mounting portion is different for each type of cassette. The controller performs: communicating via the RFID reader with the RFID tag of the cassette mounted in the cassette mounting portion; and determining whether a value of the return energy received by the RFID reader in the communicating falls within any one of the standard ranges indicated by the correlations.

19 Claims, 11 Drawing Sheets

(56) References Cited

U.S. PATENT DOCUMENTS

| | | | |
|---|---|---|---|
| 2009/0162078 A1* | 6/2009 | Kojo | G03G 15/556 399/13 |
| 2010/0117801 A1 | 5/2010 | Okada | |
| 2020/0201211 A1* | 6/2020 | Kogiso | G03G 15/1675 |

* cited by examiner

FIG. 6

| TYPE OF CASSETTES | THICKNESS DIMENSION W [mm] | COMMUNICATION DISTANCE L [mm] | VOLTAGE RANGE [V] |
|---|---|---|---|
| TYPE 1 | 12 | 27 | 18~22 |
| TYPE 2 | 18 | 24 | 25~29 |
| TYPE 3 | 24 | 21 | 31~35 |
| TYPE 4 | 36 | 15 | 42~50 |
| ... | ... | ... | ... |

PRINTING DEVICE INCLUDING CASSETTE MOUNTING PORTION IN WHICH A PLURALITY OF TYPES OF CASSETTES IS CONFIGURED TO BE SELECTIVELY MOUNTED

CROSS REFERENCE TO RELATED APPLICATION

This application claims priority from Japanese Patent Application No. 2019-198579 filed Oct. 31, 2019. The entire content of the priority application is incorporated herein by reference.

TECHNICAL FIELD

The present disclosure relates to a printing device configured to communicate with an RFID tag or the like provided on a cassette.

BACKGROUND

The International Publication No. 2006/33430 discloses a printing device that can communicate with an RFID tag or the like provided on a cassette. In this conventional printing device (tape printer), any of a plurality of types of cassettes (tape cassettes) is selectively mounted in a cassette mounting section (cassette housing section) for use. An RFID tag provided on each cassette stores cassette information about that cassette (information related to the tape cassette). Using an antenna to acquire this cassette information through communication with the RFID tag described above enables the printing device to discern what type of cassette has been mounted in the device and to perform print control and the like according to the type of the cassette.

SUMMARY

However, the antenna described above for communicating with the RFID tag has a communication range of a certain distance. Accordingly, the antenna may inadvertently communicate with an RFID tag that fell off a previously mounted cassette and is present inside the printing device or an RFID tag present outside the printing device that happens to be adjacent to the printing device at that time, for example. In such cases, the antenna may acquire cassette information from the wrong RFID tag.

In view of the foregoing, it is an object of the present disclosure to provide a printing device can determine whether communication has been correctly performed with the RFID tag provided on the mounted cassette.

In order to attain the above and other objects, according to one aspect, the present disclosure provides a printing device including an RFID reader, a cassette mounting portion, a memory, a printing portion, and a controller. The RFID reader includes a reader antenna. The cassette mounting portion is configured such that a plurality of types of cassettes can be selectively mounted in the cassette mounting portion. Each of the plurality of types of cassettes includes an RFID tag storing therein cassette information related to the cassette. The RFID tag includes a tag antenna configured to communicate with the reader antenna. Communication sensitivity between the reader antenna and the tag antenna when the cassette is mounted in the cassette mounting portion is different for each of the plurality of types of cassettes. The memory stores therein correlations between the plurality of types of cassettes and a plurality of standard ranges concerning a return energy received by the RFID reader from the tag antenna. The printing portion is configured to print on a print medium. The controller configured to perform: (a) controlling the printing portion to print; (b) communicating via the RFID reader with the RFID tag of the cassette mounted in the cassette mounting portion; and (c) determining whether a value of the return energy received by the RFID reader in the (b) communicating falls within any one of the plurality of standard ranges indicated by the correlations.

BRIEF DESCRIPTION OF THE DRAWINGS

The particular features and advantages of the embodiment(s) as well as other objects will become apparent from the following description taken in connection with the accompanying drawings, in which:

FIG. 6 is a table illustrating correlations indicating the relationship between values for the thickness dimension and communication distance and measured values of the communication sensitivity for each cassette;

DETAILED DESCRIPTION

An embodiment of the present disclosure will be described while referring to the accompanying drawings.

<Connection of a Printer and a Terminal>

Figure 1:
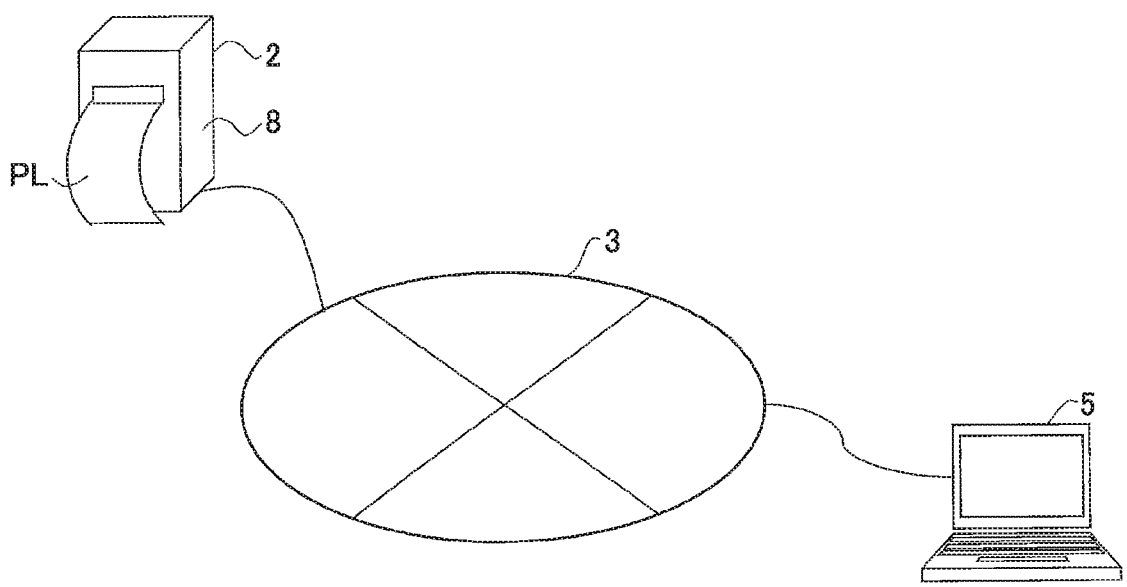
FIG. 1 is a schematic diagram illustrating a configuration of a system including a printer according to an embodiment of the present disclosure.

As illustrated in FIG. 1, a printer 2 (corresponding to the printing device) according to the present embodiment is connected to a terminal 5 (corresponding to the external device) via a wired or wireless communication line 3. The terminal 5 may be configured of a laptop computer or a desktop computer, for example. Alternatively, the terminal 5 may be a smartphone, a feature phone, a tablet computer, or the like. The printer 2 exchanges various information and control signals with the terminal 5. Based on user operations performed on the terminal 5, the printer 2 creates a printed label PL having printed content, such as desired text, images, and the like.

<Overall Structure of the Printer>

Figure 2:
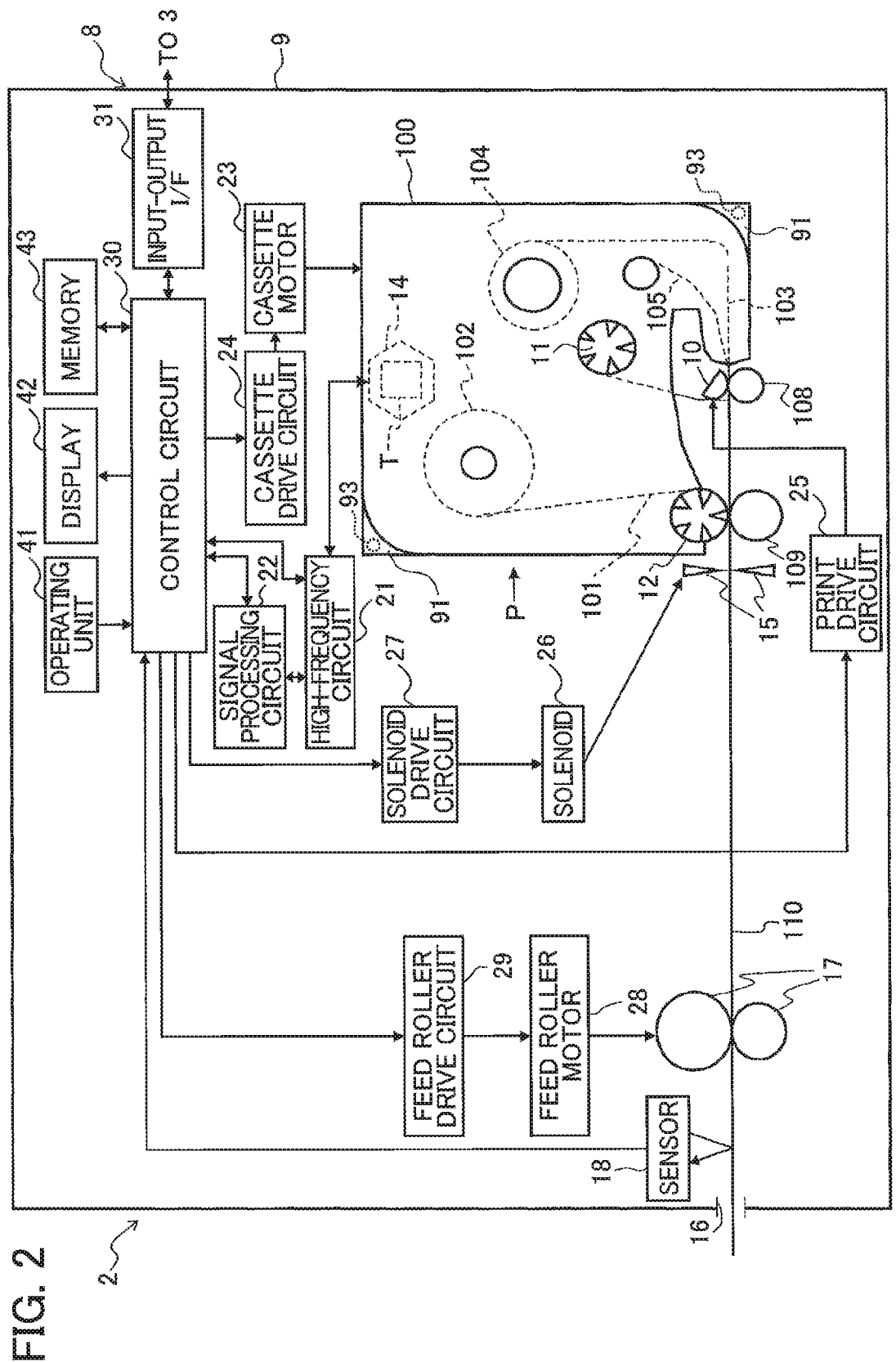
FIG. 2 is a conceptual diagram illustrating a detailed structure of the printer.

FIG. 2 is a schematic diagram illustrating a detailed structure of the printer 2. As illustrated in FIG. 2, the printer 2 has a main device body 8, a cassette holder CH (corresponding to the cassette mounting portion) (see FIG. 5 described later), and a casing 9 constituting the outer shell of the main device body 8. A plurality of types of cassettes 100 can be selectively mounted in the cassette holder CH.

Within the casing 9 described above, the main device body 8 has a print head 10 (corresponding to the printing portion), a ribbon take-up roller drive shaft 11, a pressure roller drive shaft 12, an antenna 14 (corresponding to the reader antenna), a cutter 15, a feed roller 17, an operating unit 41, a display 42 for displaying desired information, and a memory 43.

The print head 10 prints desired content on a print tape 103 (corresponding to the print medium) paid out from a print tape roll 104. The ribbon take-up roller drive shaft 11 drives a ribbon take-up roller 106 (see FIG. 3 described later) to take up the portion of an ink ribbon 105 already used for printing on the print tape 103. The pressure roller drive shaft 12 drives a pressure roller 107 (see FIG. 3 described later) for bonding the print tape 103 with a base tape 101 paid out from a base tape roll 102 while discharging the bonded print tape 103 and base tape 101 from the cassette 100 as a printed label tape 110. The antenna 14 exchanges signals with an RFID tag T (described later in detail) provided in the cassette 100 through electromagnetic induction type wireless communication. The cutter 15 generates the printed label PL described above by cutting the printed label tape 110 to a prescribed length at a prescribed timing. The feed roller 17 conveys and feeds the printed label PL to a discharge port 16.

The antenna 14 is configured of a directional antenna for radiating or receiving greater power in a specific direction (the direction toward the observer of the diagram of FIG. 2 in this example), for example. Additionally, the main device body 8 possesses a high-frequency circuit 21, a signal processing circuit 22, a cassette motor 23, a cassette drive circuit 24, a print drive circuit 25, a solenoid 26, a solenoid drive circuit 27, a feed roller motor 28, a feed roller drive circuit 29, and a control circuit 30.

The high-frequency circuit 21 accesses (reads from or writes to) the RFID tag T via the antenna 14. The signal processing circuit 22 processes signals read from the RFID tag T. The cassette motor 23 drives the ribbon take-up roller drive shaft 11 and pressure roller drive shaft 12 described above. The cassette drive circuit 24 controls driving of the cassette motor 23. The print drive circuit 25 controls the conduction of electricity to the print head 10. The solenoid 26 drives the cutter 15 to perform a cutting operation. The solenoid drive circuit 27 controls the solenoid 26. The feed roller motor 28 drives the feed roller 17. The feed roller drive circuit 29 controls driving of the feed roller motor 28. The control circuit 30 controls overall operations of the printer 2 via the high-frequency circuit 21, signal processing circuit 22, cassette drive circuit 24, print drive circuit 25, solenoid drive circuit 27, feed roller drive circuit 29, and the like. Here, the combination of the antenna 14, high-frequency circuit 21, and signal processing circuit 22 is an example of the RFID reader.

The control circuit 30 is a microcomputer. While not illustrated in detail in the drawings, the control circuit 30 is configured of a central processing unit (CPU), a read-only memory (ROM), a random-access memory (RAM), and the like. The control circuit 30 uses the temporary storage function of the RAM to perform signal processing based on a program prestored in the ROM. The control circuit 30 is also connected to the communication line 3 via an input/output interface 31 and can exchange information with the terminal 5 that is connected to this communication line 3.

<Cassette>

Figure 3:
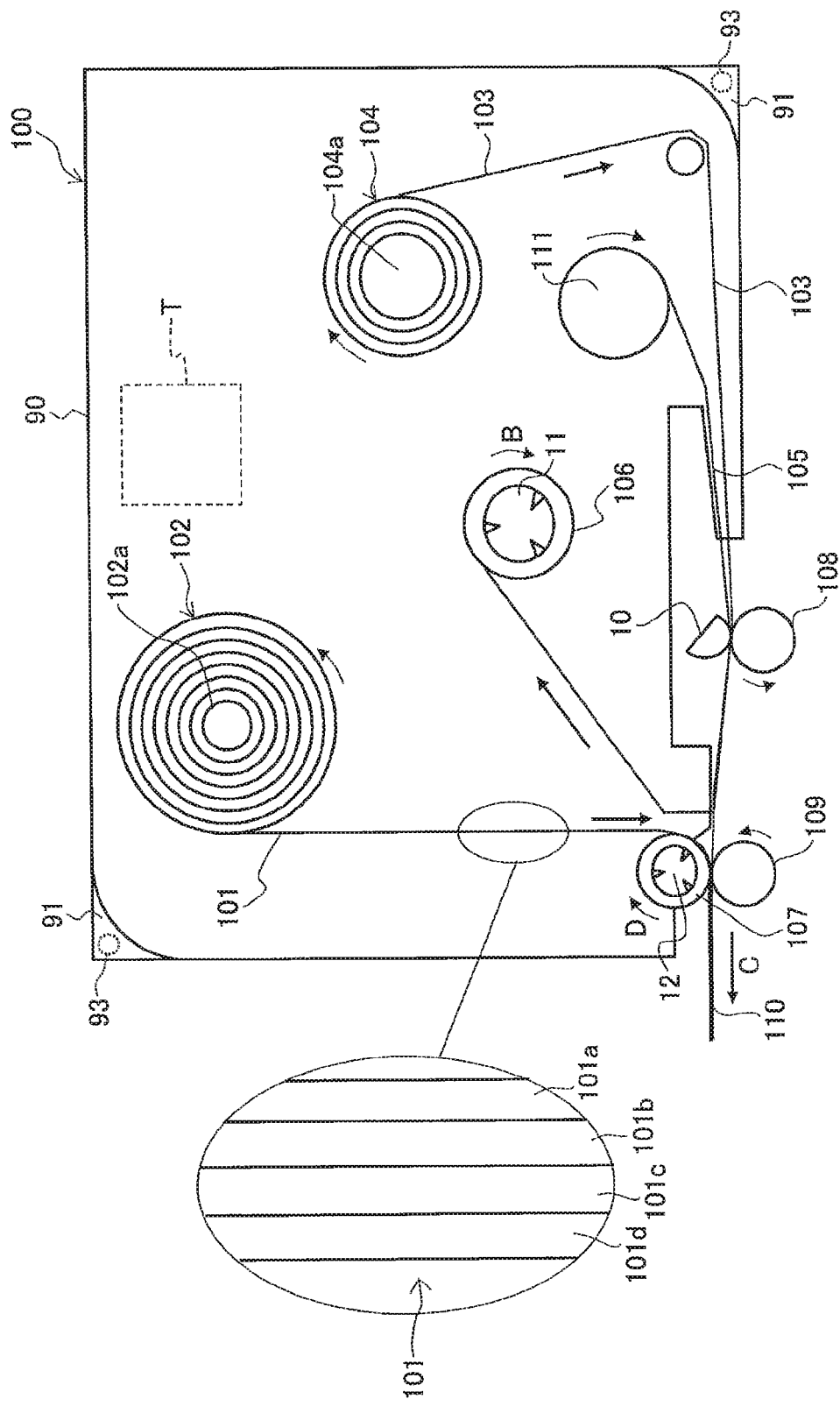
FIG. 3 is an explanatory view schematically illustrating a configuration of a cassette that can be mounted in the printer.

FIG. 3 is a schematic diagram conceptually illustrating the structure of the cassette 100. As illustrated in FIG. 3, the cassette 100 has a casing 90, the base tape roll 102, the print tape roll 104, a ribbon supply roll 111, the ribbon take-up roller 106, and the pressure roller 107. The base tape roll 102 is disposed in the casing 90 and is configured of a strip-like base tape 101 wound in a roll. The print tape roll 104 is configured of the transparent print tape 103 wound in a roll. The print tape 103 has substantially the same width as the base tape 101. The ribbon supply roll 111 pays out the ink ribbon 105 described above. The ribbon take-up roller 106 takes up the ink ribbon 105 that has been used for printing. Note that the ink ribbon 105 is unnecessary when the print tape 103 is a thermal tape.

The pressure roller 107 presses the base tape 101 and print tape 103 against a sub-roller 109 described later, causing the base tape 101 and print tape 103 to become bonded together. The bonded base tape 101 and print tape 103 form the printed label tape 110. While forming the printed label tape 110 in this way, the pressure roller 107 feeds the printed label tape 110 in the direction indicated by the arrow C.

The base tape roll 102 is formed by winding the base tape 101 around a reel member 102a. The base tape 101 has a four-layer structure in this example (see the partially-enlarged view in FIG. 3). Beginning from the inside of the base tape 101 in its wound state (the right side in the partially-enlarged view of FIG. 3) and progressing toward the opposite side (the left side in the partially-enlarged view of FIG. 3), the base tape 101 is configured of the following layers laminated in the following order: an adhesive layer 101a formed of an appropriate adhesive, a colored base film 101b formed of polyethylene terephthalate (PET) or the like, an adhesive layer 101c formed of an appropriate adhesive, and a release material 101d.

The print tape roll 104 is formed by winding the print tape 103 about a reel member 104a. The ink ribbon 105 conveyed by the ribbon supply roll 111 and ribbon take-up roller 106 described above contacts the back surface of the print tape 103 paid out from the print tape roll 104 as the ink ribbon 105 and print tape 103 are pressed against the print head 10 by a platen roller 108.

The cassette motor 23 described above (see FIG. 2) transmits a drive force to the ribbon take-up roller drive shaft 11 and pressure roller drive shaft 12, and the ribbon take-up roller drive shaft 11 and pressure roller drive shaft 12 drive the corresponding ribbon take-up roller 106 and pressure roller 107 to rotate.

The RFID tag T includes a tag antenna (not illustrated) capable of communicating with the antenna 14, and a tag memory (not illustrated) connected to this tag antenna. The tag memory stores cassette information related to the cassette 100. The cassette information includes the tape width of the print tape 103, the tape color of the print tape 103, the remaining tape length of the print tape 103, the tape width of the base tape 101, the tape color of the base tape 101, the remaining tape length of the base tape 101, the ink color of the ink ribbon 105, and a thickness dimension W of the cassette 100 (see FIG. 5 described later), for example.

<Casing>

Figure 4:
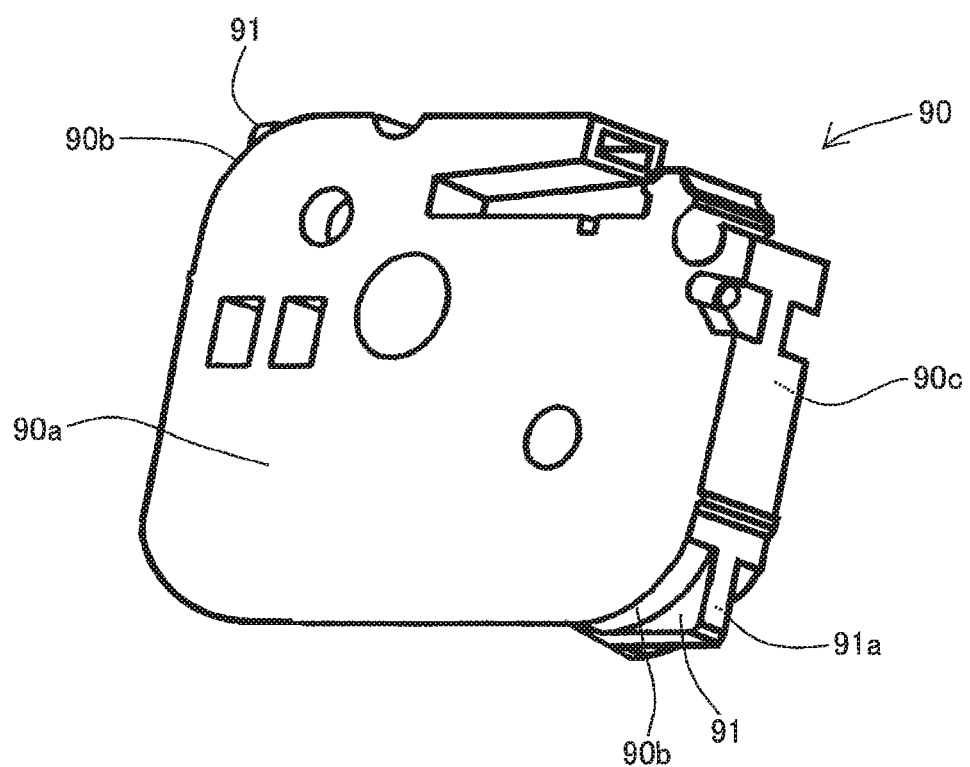
FIG. 4 is a perspective view illustrating only a casing of the cassette.

FIG. 4 is a perspective view illustrating only the casing 90 of the cassette 100. As illustrated in FIG. 4, the casing 90 is provided with a main casing body 90a. In this example, the main casing body 90a has a general plate shape whose thickness direction coincident with the depth direction in FIG. 4. The main casing body 90a has a general rectangular shape when viewed from a flat-surface side. The main casing body 90a has rounded corners 90b on two opposing corners (the upper-left and lower-right corners in FIG. 4) along a diagonal line of the general rectangular shape when viewed from the flat-surface side. A positioning rib 91 is formed in each rounded corner 90b at an intermediate position in the thickness direction. The positioning ribs 91 protrude laterally and have a thickness that is smaller than that of the main casing body 90a. A flat rib contact surface 91a constitutes the surface (the back surface in FIG. 4) of each positioning rib 91 that opposes the inner bottom surface of the cassette holder CH (see FIG. 5 described later). The rib contact surfaces 91a are positioned in the same plane.

As described above, a plurality of types of cassettes 100 is available for use in the printer 2. The different types of cassettes 100 differ in the thickness dimension of the main casing body 90a (described later in greater detail) depending on the width of the base tape accommodated in the cassette 100. The cassette 100 mounted in the cassette holder CH can be replaced as needed depending on the application and the like.

<Overview of Printing Operations>

Next, operations of the printer 2 having the structure described above will be described. When a cassette 100 is mounted in the cassette holder CH of the main device body 8, the print tape 103 and ink ribbon 105 become pinched between the print head 10 and the platen roller 108, and the base tape 101 and print tape 103 become pinched between the pressure roller 107 and sub-roller 109. The drive force of the cassette motor 23 drives the ribbon take-up roller 106 and pressure roller 107 to rotate in synchronization in the directions of respective arrows B and D illustrated in FIG. 3.

Here, the pressure roller drive shaft 12 described above is coupled to the sub-roller 109 and platen roller 108 through gears (not illustrated). Thus, the pressure roller 107, sub-roller 109, and platen roller 108 rotate along with the drive of the pressure roller drive shaft 12, paying out the base tape 101 from the base tape roll 102 and supplying the base tape 101 to the pressure roller 107, as described above.

In the meantime, the print tape 103 is paid out from the print tape roll 104, and the print drive circuit 25 supplies electricity to a plurality of heating elements in the print head 10. Through this process, desired printing content is printed on the back surface of the print tape 103. Subsequently, the base tape 101 and the printed portion of the print tape 103 are bonded together between the pressure roller 107 and sub-roller 109 to form the printed label tape 110, and the printed label tape 110 is discharged from the cassette 100.

Prior to executing the printing operation described above, when the cassette 100 is mounted in the cassette holder CH, the antenna 14 in the printer 2 performs communication with the RFID tag T provided on the cassette 100 to acquire cassette information stored in the tag memory. This operation enables the printer 2 to recognize what type of cassette 100 has been mounted in the cassette holder CH. Accordingly, the printer 2 can perform proper control of the print head 10 (print control) and the like based on the type of cassette 100.

<Possible Problem in Conventional Printer when Communicating with RFID Tag>

Normally, the antenna has the capacity to cover a communication range of a certain distance. Consequently, when attempting to communicate with an RFID tag on a cassette mounted in the cassette holder of a conventional printer as described above, the antenna of the conventional printer could inadvertently communicate with another RFID tag, such as an RFID tag that came off a cassette previously mounted in the cassette holder and remains inside the printer or a different RFID tag adjacent to but outside the printer. As a result, the conventional printer may acquire incorrect information from that RFID as the cassette information.

<Features of the Embodiment>

To avoid the problem described above, the printer 2 according to the present embodiment determines, using the fact that the value of communication sensitivity between the RFID tag T of each cassette 100 and the antenna 14 on the printer 2 is different for each type of cassette 100, whether proper communication has been performed at the time of mounting of a cassette 100 in the cassette holder CH. This determination is performed. This process will be described in detail below.

<Structure of the Cassette Holder for Supporting the Cassette>

Figure 5A:
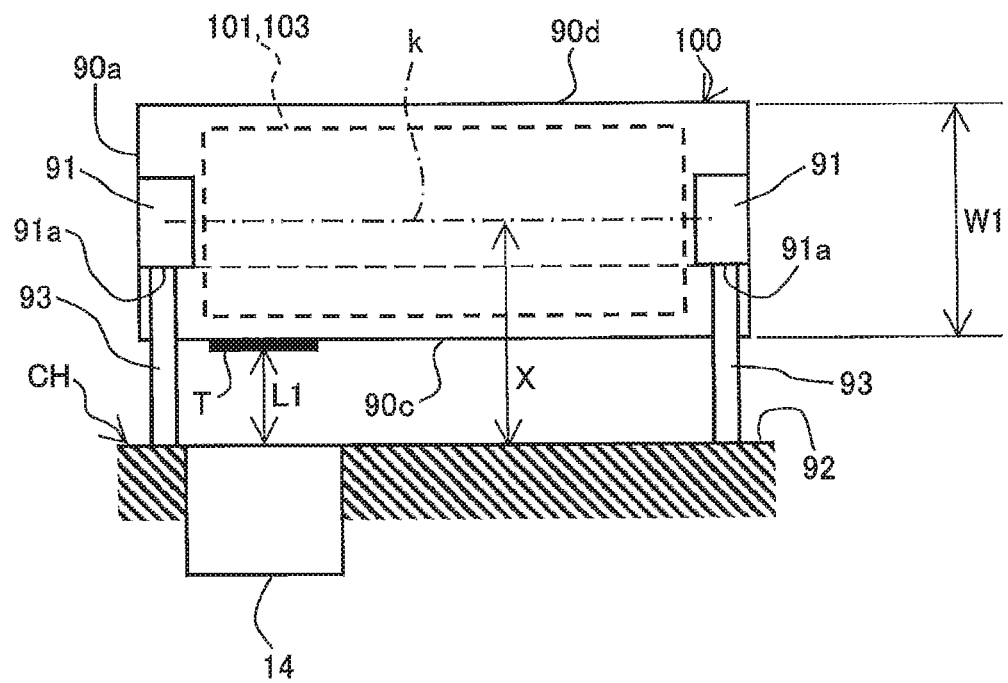
FIG. 5A is an explanatory view illustrating a structure provided in a cassette holder of the printer for supporting the cassette, the view specifically illustrating a state where the cassette whose tape width is wide is supported.
Figure 5B:
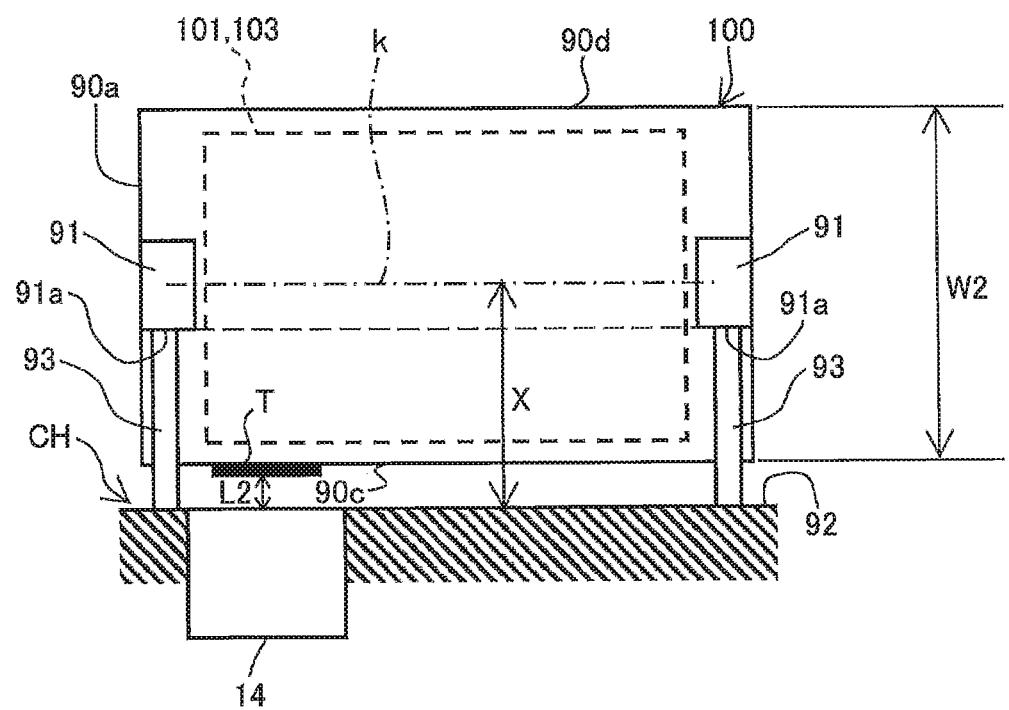
FIG. 5B is an explanatory view illustrating the structure for supporting the cassette, the view specifically illustrating a state where the cassette whose tape width is narrow is supported.

Next, the support structure for supporting the cassette 100 that is provided in the cassette holder CH in order to implement the above method will be described with reference to FIG. 5. FIG. 5A illustrates a state where a cassette 100 with a narrow tape width is supported in the cassette holder CH, and FIG. 5B illustrates a state where a cassette 100 with a wide tape width is supported in the cassette holder CH. Note that FIGS. 5A and 5B correspond to the allow view of the arrow P depicted in FIG. 2.

As illustrated in FIG. 5A, the cassette holder CH is a recessed portion provided in the main device body 8 in which the cassette 100 can be detachably fitted. The inner bottom surface of the cassette holder CH constitutes a bottom holder surface 92. The print head 10, ribbon take-up roller drive shaft 11, pressure roller drive shaft 12, and the like are provided on the bottom holder surface 92. The antenna 14 is embedded in the bottom holder surface 92 such that the top surface of the antenna 14 is exposed on the bottom holder surface 92. Two positioning pins 93 having the same height as each other are provided in the two corners of the bottom holder surface 92 corresponding to the positions of the positioning ribs 91 when the cassette 100 is mounted in the cassette holder CH.

The positioning pins 93 are erected vertically from the bottom holder surface 92. When a cassette 100 is mounted in the cassette holder CH, the leading ends of the two positioning pins 93 contact the rib contact surfaces 91a of the corresponding positioning ribs 91 to support the cassette 100. Hence, the positioning pins 93 have a height dimension that is greater than the distance from the rib contact surfaces 91*a* to a bottom casing surface 90*c* of the mounted cassette 100.

Here, the thickness dimension of the main casing body 90*a* varies (increases or decreases) according to the width of the base tape 101 provided in the cassette 100. In other words, the thickness dimension of the main casing body 90*a* varies depending on the type of the cassette 100. That is, when the width of the print tape 103 and base tape 101 is narrow, as in the example of FIG. 5A, the thickness dimension W1 of the main casing body 90*a* is relatively small. On the other hand, when the width of the print tape 103 and base tape 101 is wide, as in the example of FIG. 5B, the thickness dimension W2 of the main casing body 90*a* is relatively large.

For convenience, the thickness dimensions W1 and W2 of the cassettes 100 will be collectively referred to as the thickness dimension W in the following description. Each cassette 100 is formed such that the center of the positioning rib 91 in the height direction is aligned with a center line of the thickness dimension W, i.e., a center line k of the main casing body 90*a* in the height direction. As a result, a distance X from the center line k to the bottom holder surface 92 remains a fixed value, even when cassettes 100 of types having differing thickness dimensions W are mounted in the cassette holder CH, as in the examples of FIGS. 5A and 5B.

In the present embodiment, the RFID tag T is provided on one side of the main casing body 90*a* in the thickness direction (the bottom casing surface 90*c* in this example, which is the surface nearest the antenna 14). Hence, when the cassettes 100 described above are mounted in the cassette holder CH, a distance L1 from the RFID tag T (and specifically, the tag antenna provided in the RFID tag T) to the antenna 14 for the cassette 100 having the narrow tape width illustrated in FIG. 5A is greater than a distance 12 from the RFID tag T (and specifically, the tag antenna) to the antenna 14 for the cassette 100 having the wide tape width illustrated in FIG. 5B. For convenience, the distances L, L2, and the like from the RFID tag T (tag antenna) to the antenna 14 for respective cassettes 100 will be collectively referred to as the "communication distance L."

When communicating with the RFID tag T of the cassette 100, the antenna 14 transmits a query signal and receives a response signal (including the cassette information described above) from the RFID tag T in response to the query signal, for example. Normally, the energy detected by the antenna 14 (hereinafter called the "return energy") when the response signal is received is larger when the communication sensitivity between the antenna 14 and RFID tag T is higher and smaller when the communication sensitivity is lower. Accordingly, the return energy will be smaller for the cassette 100 illustrated in FIG. 5A having the narrower tape width, since the distance L1 is relatively large, making communication sensitivity lower, and return energy will be greater for the cassette 100 illustrated in FIG. 5B having the wider tape width, since the distance L2 is relatively small, making communication sensitivity higher.

Using the properties described above, correlations are prestored in the memory 43 of the present embodiment indicating the relationship between values for the thickness dimension W and communication distance L and measured values of the communication sensitivity for each cassette 100. The table in FIG. 6 illustrates an example of such correlations. In the example illustrated in FIG. 6, the voltage value generated when the return signal is received from the RFID tag T via the antenna 14 (the voltage detected through a well-known technique; hereinafter simply called the "return voltage") is used as the communication sensitivity.

In the example illustrated in FIG. 6, a cassette 100 of Type 1 having a thickness dimension W of 12 mm is correlated with a communication distance L of 27 mm and the values of return voltage that fall within the range 18-22 V (corresponding to the standard range; the same applies hereafter). Similarly, for a cassette 100 of Type 2 having a thickness dimension W of 18 mm, the communication distance L is 24 mm and the values of return voltage are within the range 25-29 V. For a cassette 100 of Type 3 having a thickness dimension W of 24 mm, the communication distance L is 21 mm and the values of return voltage are within the range 31-35 V. For a cassette 100 of Type 4 having a thickness dimension W of 36 mm, the communication distance L is 15 mm and the values of return voltage are within the range 42-50 V. The table further includes Type 5, Type 6, and other types with even larger thickness dimensions W, but these types have been omitted from FIG. 6.

When a cassette 100 is actually mounted in the cassette holder CH of the printer 2 and the antenna 14 communicates with the RFID tag T, the printer 2 determines whether the antenna 14 communicated properly with the RFID tag T in the mounted cassette 100, rather than communicating mistakenly with a different RFID tag T, based on what range of return voltages illustrated in the table of FIG. 6 includes the value of the return voltage. Below, this process will be described in greater detail with reference to the flowchart in FIG. 7.

<Control Process>

Figure 7:
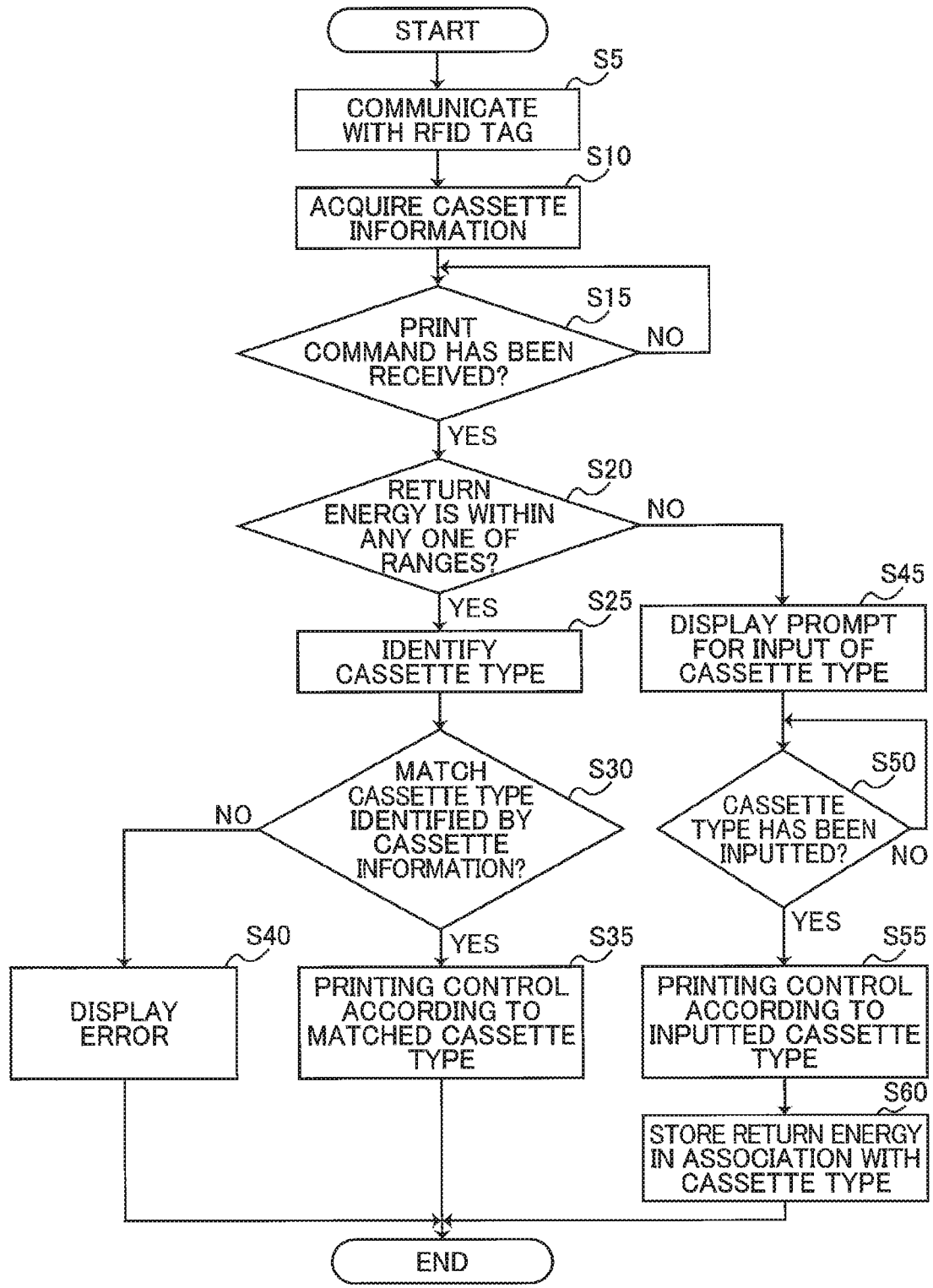
FIG. 7 is a flowchart illustrating steps in a control process executed by a CPU of a control circuit of the printer.

FIG. 7 is a flowchart illustrating steps in a control process executed by the CPU of the control circuit 30 to implement the method described above. In S5 at the beginning of the process in FIG. 7, the CPU controls the high-frequency circuit 21 to communicate with the RFID tag T via the antenna 14.

In S10 the CPU acquires through the signal processing circuit 22 the cassette information that the antenna 14 has received from the RFID tag T.

In S15 the CPU determines whether a print command corresponding to a user operation on the terminal 5 has been received via the input/output interface 31 (or whether a print command has been received through a user operation on the operating unit 41). While a print command has not been received (S15: NO), the CPU waits by continually looping back to S15. When a print command has been received (S15: YES), the process advances to S20.

In S20 the CPU determines whether the return voltage based on a return energy detected when the response signal has been received from the RFID tag T in S5 is within one of the return voltage ranges defined by the correlations stored in the memory 43 (see FIG. 6). If the return voltage belongs to one of the ranges of return voltage (S20: YES), the CPU advances to S25.

In S25 the CPU references the above correlations (see FIG. 6) to identify the type of cassette 100 corresponding to the return voltage based on the return energy detected in S5 (hereinafter called a "first cassette type" for convenience). Subsequently, the CPU advances to S30.

In S30 the CPU determines whether the type of cassette 100 identified according to the return voltage in S25 matches the type of cassette 100 identified by the cassette information acquired in S10 (hereinafter called the "second cassette type" for convenience).

If the first cassette type matches the second cassette type (S30: YES), the CPU advances to S35. In S35 the CPU controls, on the basis of the type of cassettes 100 found to match in S30, the print head 10 and cassette motor 23 through the print drive circuit 25 and cassette drive circuit 24 (i.e., executes print control) according to a mode suited to the cassette type. Subsequently, the CPU ends the control process.

If the first cassette type does not match the second cassette type (S30: NO), in S40 the CPU controls the display 42 to display a prescribed error message (or sound an alarm or the like). Subsequently, the CPU ends the control process. Alternatively, the CPU may display an error message (or sound an alarm or the like) on a desired display unit provided in the terminal 5 by outputting a display control signal to the terminal 5 via the input/output interface 31.

On the other hand, if the CPU determines in S20 that the return voltage does not belong to any range of return voltages defined in the correlations (S20: NO), the CPU advances to S45.

In S45 the CPU controls the display 42 to display a prescribed message prompting the user to input the type of cassette 100. Alternatively, the CPU may output a display control signal to the terminal 5 via the input/output interface 31 to display a message on a desired display unit provided in the terminal 5 prompting the user to input the type of cassette 100. Subsequently, the CPU advances to S50.

In S50 the CPU determines whether a cassette type has been acquired as a result of the user performing an input operation on the operating unit 41 in response to the display in S45 (or whether a cassette type inputted through an operation on the terminal 5 has been acquired via the input/output interface 31. If a cassette type has not been acquired (S50: NO), the CPU waits by continually looping back to S50. When a cassette type has been acquired (S50: YES), the CPU advances to S55.

In S55 the CPU controls, on the basis of the type of cassette 100 acquired through the input operation in S50, the print head 10 and cassette motor 23 through the print drive circuit 25 and cassette drive circuit 24 according to a mode suited to the cassette type.

In S60 the CPU stores in the memory 43 the return energy (and specifically the return voltage in this example) detected in S and the type of cassette 100 acquired in S50 in association with each other. Subsequently, the CPU ends the control process.

<Effects of the Embodiment>

In the present embodiment described above, values of return energy (return voltage in the above example) received by the antenna 14 when the antenna 14 communicates with the RFID tags T in cassettes 100 are divided into a plurality of ranges, and correlations in which the plurality of ranges are associated with respective types of cassettes 100 (see FIG. 6) are prestored in the memory 43. When performing actual communication with the RFID tag T via the antenna 14, the CPU of the control circuit 30 determines whether the value of the return voltage at that time falls within one of the voltage ranges (S20 of FIG. 7).

Accordingly, when the value of the return voltage is within one of the voltage ranges, the CPU can treat this return voltage as an indication that the antenna 14 properly communicated with the RFID tag T of the cassette 100 currently mounted in the cassette holder CH.

A particular feature of the embodiment is that the cassette holder CH is configured so that the distance between the tag antenna of the RFID tag T and the antenna 14 when a cassette 100 is mounted in the cassette holder CH differs according to the type of cassette 100. Thus, the embodiment utilizes a simple configuration to achieve different communication sensitivities between the antenna 14 and tag antennas in different types of cassettes 100.

Another particular feature of the embodiment is that the thickness dimension W of the cassette 100 is configured to be different for different types of cassettes 100. By disposing the RFID tag T on the bottom casing surface 90c of the cassette 100, as described above, the distance between the tag antenna and antenna 14 can be reliably differentiated between different types of cassettes 100. Here, the RFID tag T need not necessarily be disposed on the bottom casing surface 90c constituting one side of the cassette 100 in the thickness direction but may be disposed on a top casing surface 90d (see FIG. 5) constituting the other side of the cassette 100 in the thickness direction.

Realizing different communication sensitivities between the antenna 14 and the tag antenna of RFID tags T on different types of cassettes 100 is not limited to varying the communication distance L between the tag antenna of the RFID tag T in each type of cassette 100 and the antenna 14. The communication sensitivity may be varied by mounting the RFID tag T at a different angle relative to the casing 90 in each type of cassette 100 (the same applies to all variations below). In this case, an angle of the tag antenna relative to the antenna 14 when the cassette 100 is mounted in the cassette holder CH is different in each type of cassette 100. This variation can obtain the same effects described above.

Another feature of the present embodiment is that the printer 2 infers proper communication has been performed with the RFID tag T of the cassette 100 currently mounted in the cassette holder CH when the return voltage is included in one of the voltage ranges and further confirms that this inference is correct by comparing the cassette type corresponding to that voltage range with the content of the cassette information acquired from the RFID tag T through this communication (see step S30). In this way, the printer 2 according to the present embodiment can detect with greater accuracy whether proper communication has been achieved with the RFID tag T in the cassette 100 currently mounted in the cassette holder CH.

Note that the process to be executed when the determination in S20 is positive, i.e., when the return voltage falls in one of the voltage ranges described above is not limited to the above-described process of identifying the first cassette type in S25, comparing this type with the second cassette type in S30, and then performing print control in S35. In other words, if the determination in S20 is positive, the CPU may proceed directly to S35 to perform print control based on the first cassette type identified in S25 without performing the comparison in S30.

By determining that the value of the return voltage acquired by the antenna 14 is included in one of the voltage ranges, the printer 2 infers that the RFID tag T from which the antenna 14 acquired cassette information is neither an RFID tag located outside the printer 2 nor an RFID tag T that had detached from a previously mounted cassette 100 and fallen into the printer 2, and performs print control based on this cassette information (see step S35). Hence, by inferring that proper communication has been achieved with the RFID tag T in the mounted cassette 100 when the return voltage is within one of the voltage ranges, the printer 2 can perform proper print control and the like for this type of cassette 100 based on the acquired cassette information.

Further, when the determination in S20 is negative because the return voltage does not fall within one of the voltage ranges, the printer 2 according to the present embodiment performs, provided that the user performs a prescribed input operation (an operation of inputting the type of cassette 100 in the above example, but another suitable input operation may be used) print control based on the cassette information that the antenna 14 acquired from the RFID tag T. Therefore, even when the return voltage is not included in any of the voltage ranges and thus there is the possibility that proper communication could not be performed with the RFID tag T on the cassette 100 mounted in the cassette holder CH, the printer 2 can still execute a print based on acquired cassette information in line with the user's intent.

In the present embodiment, when the determination in S20 is negative because the return voltage does not fall into any of the voltage ranges, the printer 2 prompts the user to input a cassette type in S45, waits for the input in S50, and performs print control in S55. However, this process need not necessarily be performed when the determination in S20 is negative. Specifically, if the determination in S20 is negative, the printer 2 may simply display a prescribed error message or sound an alarm or the like as in S40 without performing the processes in S45-S60. In this way, the printer 2 can notify the user that the printer 2 may have been unable to communicate properly with the RFID tag T on the cassette 100 currently mounted in the cassette holder CH because the return voltage did not fall into any of the voltage ranges.

In the present embodiment, the type of the cassette 100 inputted by the user as described above and the return voltage at that time are stored in the memory 43 as a new correlation (step S60). Accordingly, when a new type of cassette 100 is subsequently released, for example, a correlation for this cassette 100 can be stored in the memory 43 and used in place of previous correlations when the new type of cassette 100 is mounted.

In the present embodiment, the determination to determine whether the value of the return voltage when the antenna 14 communicates with the RFID tag T falls within one of the voltage ranges is performed when a print command is received from the user (see S20). However, the printer 2 may perform this determination when the CPU of the printer 2 receives notification that the terminal 5 has begun creating print data to be used for printing on the printer 2. Alternatively, the printer 2 may be provided with a suitable sensor for detecting when a cover that opens and closes over the cassette holder CH has been closed and may perform this determination when the sensor makes such a detection.

While the description has been made in detail with reference to specific embodiments, it would be apparent to those skilled in the art that many modifications and variations may be made thereto. Below, a few such variations will be described in detail, wherein like parts and components to those in the embodiment will be designated with the same reference numerals to avoid duplicating description.

(1) Prompting the User to Remount the Cassette

In one variation, when a negative determination is reached in S20 (i.e., when the return voltage does not fall in one of the voltage ranges in S20 described above), provided that a prescribed condition (described later) is met, the CPU infers that the cassette 100 may not be sufficiently mounted in the cassette holder CH and displays a message prompting the user to remount the cassette 100.

Figure 8:
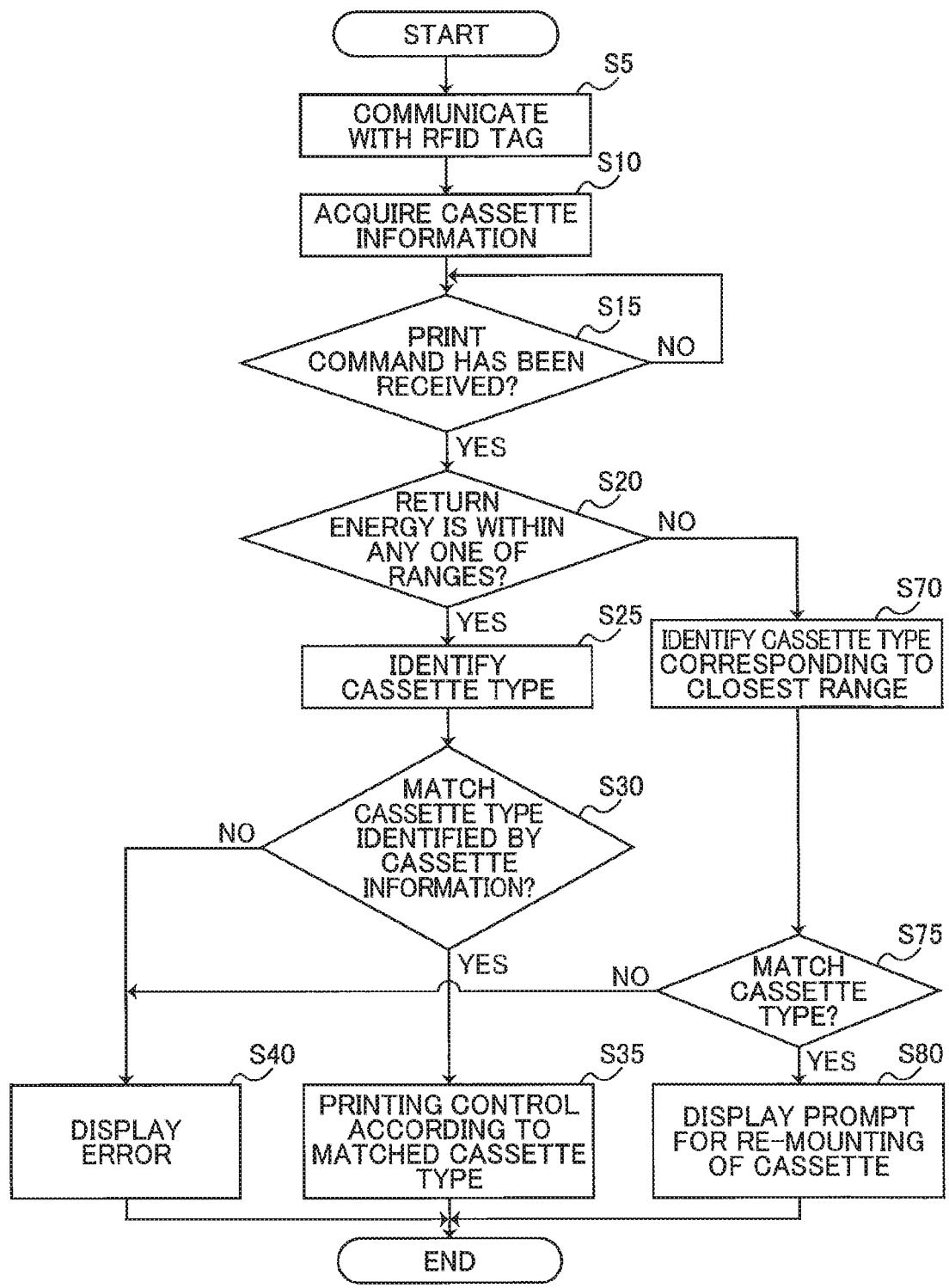
FIG. 8 is a flowchart illustrating steps in a control process executed by a CPU of a control circuit of a printer according to a variation of the embodiment, the variation being for prompting a user to remount the cassette.

FIG. 8 is a flowchart illustrating steps in the control process executed by the CPU of the control circuit 30 according to the present variation. The flowchart of FIG. 8 corresponds to the flowchart of FIG. 7. In the flowchart of FIG. 8, steps S45, S50, S55, and S60 in the flowchart of FIG. 7 have been replaced by steps S70, S75, and S80. Thus, after completing steps S5, S10, and S15 as described in FIG. 7, the CPU advances to the newly provided step S70 when reaching a negative determination in S20 (S20: NO) because the return voltage does not fall into any of the voltage ranges defined in the correlations.

In S70 the CPU determines the voltage range among the voltage ranges defined in the correlations stored in the memory 43 (see FIG. 6) that is closest to the return voltage based on the return energy detected when a response signal has been received from the RFID tag T in S5, and identifies the type of cassette 100 corresponding to this voltage range. Using the example illustrated in FIG. 6 described above, if the return voltage is 37 V, for example, then the return voltage does not fall within any of the voltage ranges 18-22 V for Type 1, 25-29 V for Type 2, 31-35 V for Type 3, 42-50 V for Type 4, or any subsequent ranges in the table of FIG. 6. Since the voltage range 31-35 V for Type 3 is the voltage range nearest 37 V, the CPU identifies Type 3 as the corresponding type of cassette 100.

In S75 the CPU determines whether the type of cassette 100 identified using the nearest voltage range in S70 (hereinafter referred to as the "third cassette type") matches the type of cassette 100 identified by the cassette information acquired in S10 (hereinafter referred to as the "fourth cassette type").

If the CPU determines in S75 that the third cassette type does not match the fourth cassette type (S75: NO), the CPU advances to S40, displays a prescribed error message (or sounds an alarm or the like) as described in the present embodiment, and ends the control process.

However, if the CPU determines in S75 that the third cassette type matches the fourth cassette type (S75: YES), in S80 the CPU outputs a control signal (the remount signal) to the display 42 to display a prescribed message (or sound an alarm or the like) on the display 42 prompting the user to temporarily remove the cassette 100 currently mounted in the cassette holder CH and subsequently remount the same cassette 100. Subsequently, the CPU ends the control process of FIG. 8. As an alternative, the CPU may display a message on a desired display unit provided on the terminal 5, or sound an alarm or the like, prompting the user to remount the cassette 100 as described above by outputting a display control signal to the terminal 5 via the input/output interface 31.

Figure 9A:
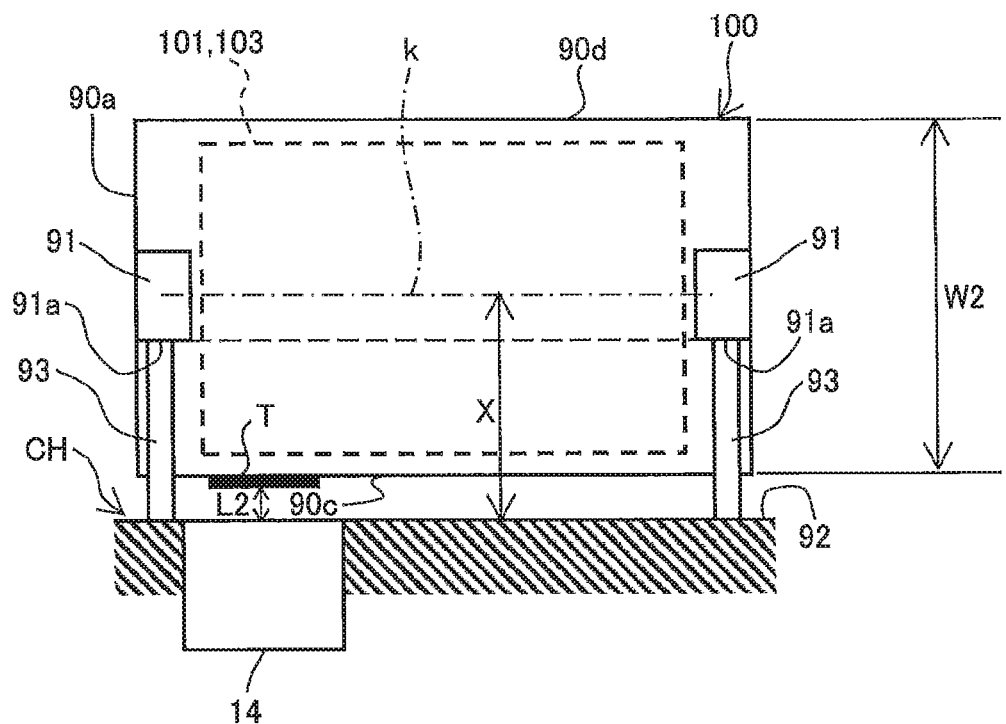
FIG. 9A is an explanatory view illustrating a state where the cassette is mounted in the cassette holder of the printer in a proper posture.
Figure 9B:
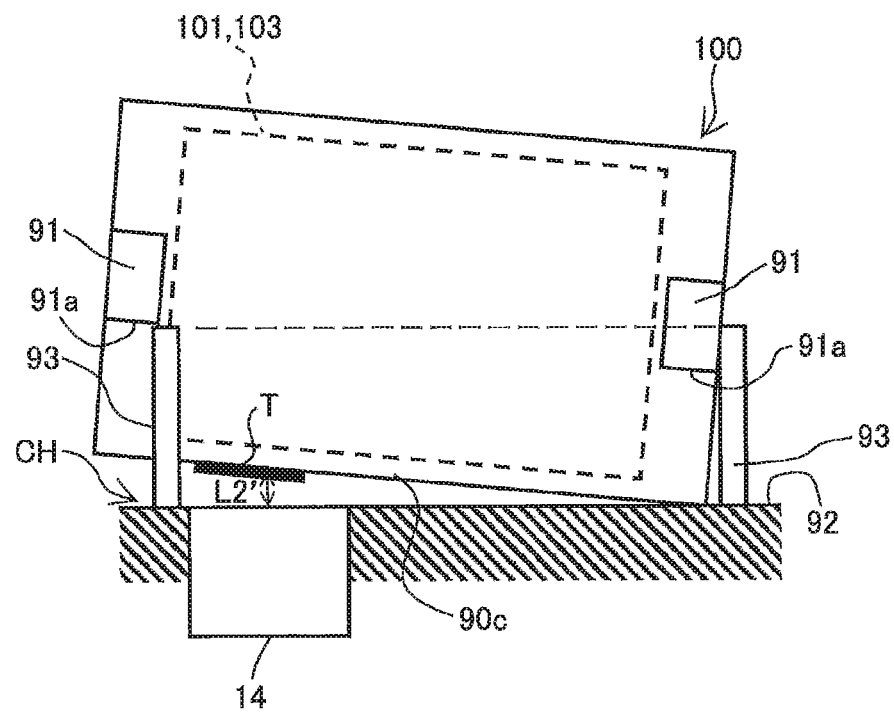
FIG. 9B is an explanatory view illustrating a state where the cassette is mounted in the cassette holder of the printer in a slightly askew posture.

The significance of displaying a message that prompts the user to remount the cartridge is as follows. If the user errs in mounting the cassette 100 in the cassette holder CH properly, does not adequately confirm that the cassette 100 has been properly mounted, or the like, for example, the cassette 100 may be set slightly askew (hereinafter referred to as "out of position") as illustrated in FIG. 9B rather than in the proper position illustrated in FIG. 9A. In such cases, communication sensitivity with the antenna 14 may be reduced. Consequently, the value of the return voltage may not fall within any of the voltage ranges.

To handle such cases in this variation, the CPU determines whether the third cassette type of the cassette 100 corresponding to the voltage range nearest the value of the return voltage matches the fourth cassette type corresponding to the cassette information acquired at this time (see step S75). If the two cassette types match, there is a high probability that the cassette 100 mounted in the cassette holder CH is out of position. Accordingly, the CPU displays a message in S80 prompting the user to remount the cassette 100. In this way, the printer 2 can notify the user that the cassette 100 mounted in the cassette holder CH is out of position and can prompt the user to reset the cassette 100 to its proper mounted position.

(2) Reading RFID Tags on Two Cassettes

Figure 10:
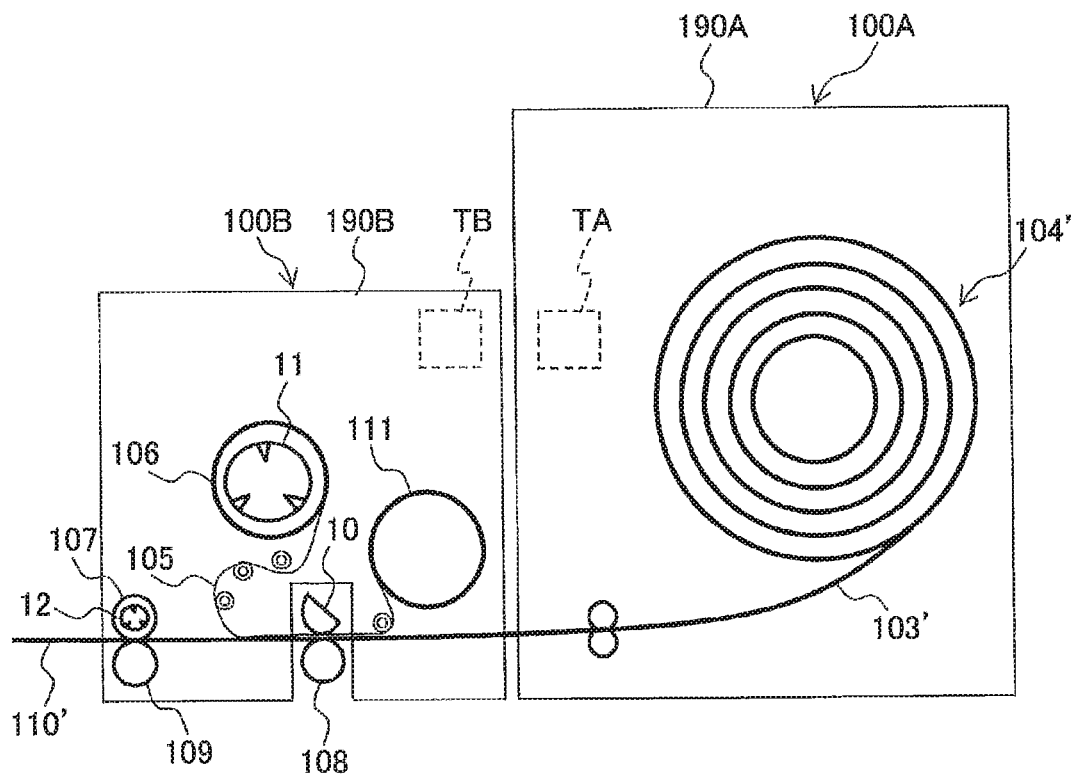
FIG. 10 is an explanatory view schematically illustrating structures of two cassettes configured to be mounted respectively in two cassette holders of a printer according to another variation of the embodiment, the another variation being for reading an RFID tag on each of the two cassette.
Figure 11:
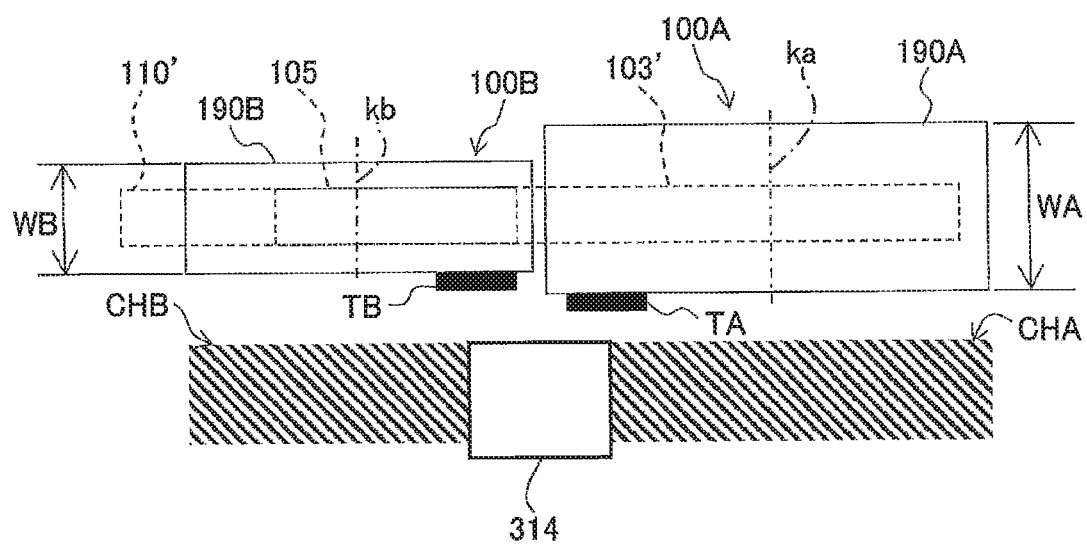
FIG. 11 is an explanatory view illustrating structures provided in the two cassette holders for supporting the two cassettes.

FIG. 10 illustrates the structure of two cassettes 100A and 100B used in a printer according to another variation. FIG. 10 corresponds to the view of FIG. 3 according to the embodiment. FIG. 11 illustrates the support structure in cassette holders of the printer according to this variation that supports the cassettes 100A and 100B. FIG. 11 corresponds to the view of FIG. 5 according to the embodiment.

<Overall Structure>

As illustrated in FIGS. 10 and 11, the printer of the present variation is provided with a cassette holder CHA (corresponding to the cassette mounting portion in this variation), and a cassette holder CHB (corresponding to the another cassette mounting portion in this variation). The cassette 100A can be mounted in the cassette holder CHA. The cassette 100A has a casing 190A, and a print tape roll 104' disposed in the casing 190A. The cassette 100A can supply a print tape 103' from the print tape roll 104'. The cassette 100B (corresponding to the ribbon cassette and the another cassette) can be mounted in the cassette holder CHB. The cassette 100B has a casing 190B, and the ribbon supply roll 111 and ribbon take-up roller 106, which are disposed in the casing 190B. The cassette 100B can supply the ink ribbon 105 from the ribbon supply roll 111.

The print tape roll 104' is formed by winding the print tape 103' about a reel member (not illustrated). The print tape 103' has a four-layer structure in this example. Beginning from the inside of the print tape 103' in its wound state and progressing toward the opposite side, the print tape 103' is configured of the following layers laminated in the following order a transfer layer onto which ink from the ink ribbon 105 is transferred, a colored base film formed of PET or the like, an adhesive layer formed of a suitable adhesive, and a release material. The ink ribbon 105 conveyed by the ribbon supply roll 111 and ribbon take-up roller 106 described above contacts the back surface of the print tape 103' paid out from the print tape roll 104' as the ink ribbon 105 and print tape 103' are pressed against the print head 10 by the platen roller 108. Heat applied by the print head 10 transfers ink onto the transfer layer of the print tape 103', forming desired printing content on the print tape 103' to create a printed label tape 110'. After printing content is formed on the print tape 103', the pressure roller 107 provided in the cassette 100B conveys the print tape 103' out of the cassette 100B. As in the present embodiment, the ribbon take-up roller 106 and pressure roller 107 are driven to rotate by the drive force of a suitable motor, similar to the cassette motor 23, transmitted to the ribbon take-up roller drive shaft 11 and pressure roller drive shaft 12.

<Cassette 100A and RFID Tag TA>

As in the present embodiment, a plurality of types of cassettes 100A is available for use in the printer of this variation. The different types of cassettes 100A differ in a thickness dimension WA of the casing 190A according to variation in the width of the print tape 103' provided in the cassette 100A. The cassette 100A mounted in the cassette holder CHA can be replaced as needed depending on the application and the like. An RFID tag TA is provided on the side surface of the cassette 100A facing the cassette holder CHA (the bottom surface of the cassette 100A in this example). The RFID tag TA has a tag antenna that is positioned on the cassette 100B side (the left side in FIG. 11) of a centerline ka of the cassette 100A when the cassette 100A is mounted in the cassette holder CHA. In other words, in a state where the cassette 100A is mounted in the cassette holder CHA, the tag antenna of the RFID tag TA is positioned closer to the cassette 100B than the centerline ka is to the cassette 100B. Note that, as indicated by the dashed line on the right side of FIG. 11, the centerline ka is a straight line extending in the thickness direction of the cassette 100A and passing through the center in a cassette array direction of the cassette 100A. The cassette array direction is a direction in which the cassette 100A and the cassette 100B are arrayed in a state where the cassette 100A and 100B are mounted in the cassette holder CHA and CHB, respectively. In the present variation, the cassette array direction is the left-right direction in FIG. 11.

A single common antenna 314 is provided for both the cassette holders CHA and CHB. The RFID tag TA and the antenna 314 are arranged so as to be arrayed in a prescribed direction (the up-down direction in FIG. 11). In other words, the antenna 314 has a portion overlapped with the RFID tag TA of the mounted cassette 100A as viewed in the thickness direction of the cassette 100A (i.e., the up-down direction in FIG. 11). Specifically, the surface direction of the RFID tag TA is parallel to the surface direction of the surface of the antenna 314 (the surface exposed from the cassette holder CHA). The RFID tag TA is provided with a tag antenna (not illustrated) capable of communicating with the antenna 314, and a tag memory (not illustrated) connected to this tag antenna. The tag memory stores cassette information related to the cassette 100A. As in the present embodiment, the cassette information includes the tape width, tape color, and remaining tape length of the print tape 103'; the thickness dimension WA of the cassette 100A; and the like, for example.

<Cassette 100B and RFID Tag TB>

Similarly, a plurality of types of cassettes 100B is available for use in the printer of the present variation. The different types of cassettes 100B have casings 190B with different thickness dimensions WB according to variations in the width and color of the ink ribbon 105 provided in the cassette 100B. The cassette 100B mounted in the cassette holder CHB can be replaced as needed depending on the application and the like. As with the cassette 100A described above, an RFID tag TB is provided on the surface of the cassette 100B facing the cassette holder CHB (the bottom surface in this example). The RFID tag TB has a tag antenna that is positioned on the cassette 100A side (the right side in FIG. 11) of a centerline kb of the cassette 100B when the cassette 100B is mounted in the cassette holder CHB. In other words, in a state where the cassette 100B is mounted in the cassette holder CHB, the tag antenna of the RFID tag TB is positioned closer to the cassette 100A than the centerline kb is to the cassette 100A. Note that, as indicated by the dashed line on the left side of FIG. 11, the centerline kb is a straight line extending in the thickness direction of the cassette 100B and passing through the center in the cassette array direction of the cassette 100B.

The RFID tag TB and the antenna 314 are arranged so as to be arrayed in a prescribed direction (the up-down direction in FIG. 11). In other words, the antenna 314 has a portion overlapped with the RFID tag TB of the mounted cassette 100B as viewed in the thickness direction of the cassette 100B (i.e., the up-down direction in FIG. 11). Specifically, the surface direction of the RFID tag TB is parallel to the surface of the antenna 314 (the surface exposed from the cassette holder CHB). The RFID tag TB is provided with a tag antenna (not illustrated) capable of communicating with the antenna 314, and a tag memory (not illustrated) connected to this tag antenna. The tag memory stores cassette information related to the cassette 100B (corresponding to the another cassette information). As in the present embodiment, this cassette information includes the width, ink color, and remaining tape length of the ink ribbon 105; the thickness dimension WB of the cassette 100B; and the like, for example.

As illustrated in FIG. 11, the distance between the RFID tag TA (and specifically, the tag antenna) and the antenna 314 when the cassette 100A is mounted in the cassette holder CHA is smaller than the distance between the RFID tag TB (and specifically, the tag antenna) and the antenna 314 when the cassette 100B is mounted in the cassette holder CHB. Consequently, the communication sensitivity between the RFID tag TA of the cassette 100A and the antenna 314 is greater than the communication sensitivity between the RFID tag TB of the cassette 100B and the antenna 314 in this variation. Thus, when the cassettes 100A and 100B are mounted in the corresponding cassette holders CHA and CHB, the CPU of the control circuit 30 uses the difference between the communication sensitivities to determine whether information acquired by the antenna 314 is cassette information related to the cassette 100A or cassette information related to the cassette 100B, as in the above-described embodiment.

As in the present embodiment, the thickness dimension WA of the cassette 100A is configured to be different for different types of cassettes 100A. Consequently, the communication sensitivity between the RFID tag TA of the cassette 100A and the antenna 314 when the cassette 100A is mounted in the cassette holder CHA will have a different value for different types of cassettes 100A. This difference in value can be used to determine whether communication has been properly achieved with the RFID tag TA of the cassette 100A.

Similarly, the thickness dimension WB of the cassette 100B is configured to be different for different types of cassettes 100B. Accordingly, the communication sensitivity between the RFID tag TB of the cassette 100B and the antenna 314 when the cassette 100B is mounted in the cassette holder CHB has a different value for different types of cassettes 100B. This difference in value can be used to determine whether communication has been properly achieved with the RFID tag TB of the cassette 100B.

The variation having the above configuration can obtain the same effects described in the above-described embodiment. Additionally, this variation can obtain the following effects.

A particular feature of this variation is that the antenna 314 is capable of communicating with both the RFID tag TA on the cassette 100A mounted in the cassette holder CHA and the RFID tag TB on the cassette 100B mounted in the cassette holder CHB. Accordingly, in a configuration that performs printing using two cassettes 100A and 100B mounted separately in the cassette holders CHA and CHB, information related to the cassettes 100A and 100B can be acquired from the corresponding RFID tags TA and TB by the single antenna 314.

Another feature of this variation is that the antenna 314 is arranged such that communication sensitivity with the RFID tag TA when the cassette 100A is mounted in the cassette holder CHA differs from communication sensitivity with the RFID tag TB when the cassette 100B is mounted in the cassette holder CHB. Owing to the difference in return energy (return voltage in the above example) that the antenna 314 acquires from the RFID tags TA and TB on the respective cassettes 100A and 100B, the single antenna 314 can be used to detect and distinguish between mounting of the cassette 100A in the cassette holder CHA and mounting of the cassette 100B in the cassette holder CHB.

Another feature of the present variation is that the tag antenna of the RFID tag TA is positioned on the cassette holder CHB side of the centerline ka of the cassette 100A when the cassette 100A is mounted in the cassette holder CHA, and the tag antenna of the RFID tag TB is positioned on the cassette holder CHA side of the centerline kb of the cassette 100B when the cassette 100B is mounted in the cassette holder CHB. That is, the tag antenna of the RFID tag TA is positioned closer to the cassette holder CHB than the centerline ka of the cassette 100A is to the cassette holder CHB in a state where the cassette 100A is mounted in the cassette holder CHA, and the tag antenna of the RFID tag TB is positioned closer to the cassette holder CHA than the centerline kb of the cassette 100B is to the cassette holder CHA in a state where the cassette 100B is mounted in the cassette holder CHB. Accordingly, both the tag antenna in the RFID tag TA of the cassette 100A mounted in the cassette holder CHA and the tag antenna in the RFID tag TB of the cassette 100B mounted in the cassette holder CHB can be disposed at positions near each other. As a result, the antenna 314 provided for communicating with both tag antennas can be of a smaller size.

Figure 12:
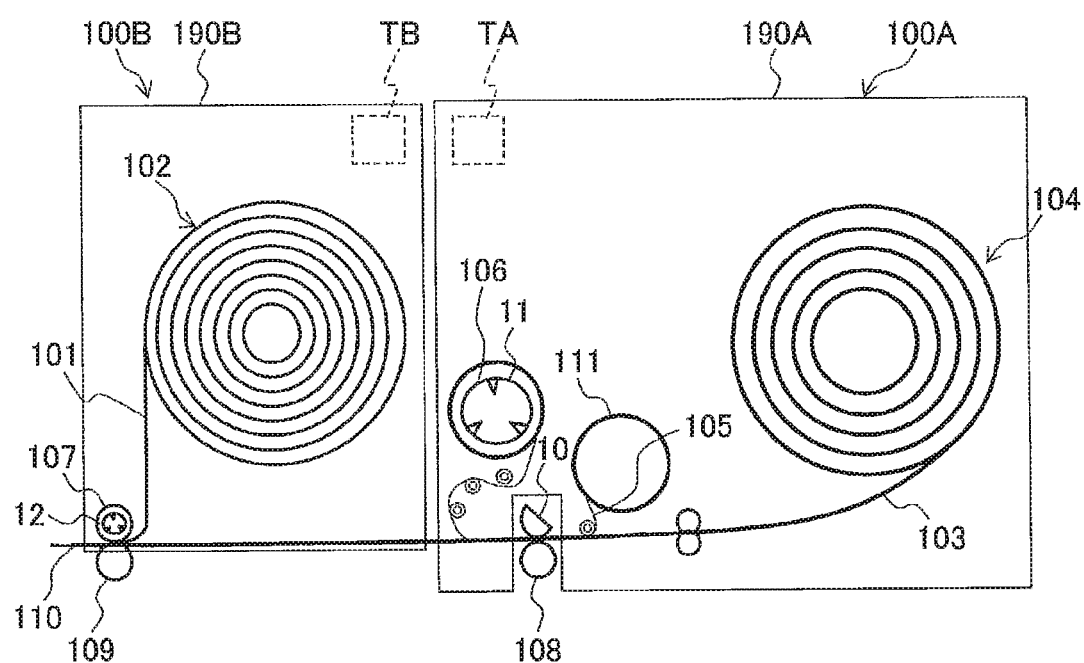
FIG. 12 is an explanatory view schematically illustrating structures of two cassettes configured to be mounted respectively in two cassette holders of a printer according to still another variation of the embodiment, the still another variation being for reading an RFID tag on each of the two cassettes.

Another variation illustrated in FIG. 12 is also conceivable when using both the cassette 100A provided with the RFID tag TA and the cassette 100B provided with the RFID tag TB, as described above. In this example, the internal configuration of the cassette 100 illustrated in FIG. 3 and the like for the present embodiment is divided between the cassette 100A and the cassette 100B. Specifically, the print tape roll 104 formed by winding the print tape 103 (the print medium), the ribbon supply roll 111 that pays out the ink ribbon 105, and the ribbon take-up roller 106 that takes up the printed ink ribbon 105 after printing are arranged in the casing 190A of the cassette 100A (the medium cassette and the cassette).

Further, the base tape roll 102 formed by winding the base tape 101 (the laminating tape) that is to be laminated over and bonded with the print tape 103, and the pressure roller 107 are disposed in the casing 190B of the cassette 100B (the laminating medium cassette and the another cassette). Note that the laminating tape is not limited to the base tape 101 described above but may be a suitable decorative film tape or the like.

With the above configuration, when the cassette 100A and the cassette 100B are mounted in their corresponding cassette holders (not illustrated in the drawings; corresponding to the cassette mounting portion and the another cassette mounting portion in the present variation), in the cassette 100A, the print tape 103 and ink ribbon 105 are pinched between the print head 10 and platen roller 108, and in the cassette 100B, the base tape 101 and print tape 103 introduced from the cassette 100A are pinched between the pressure roller 107 and sub-roller 109. As in the above-described embodiment, the pressure roller 107, sub-roller 109, platen roller 108, and ribbon take-up roller 106 rotate in accordance with the drive of the ribbon take-up roller drive shaft 11 and pressure roller drive shaft 12, at which time the base tape 101 is paid out from the base tape roll 102 and supplied to the pressure roller 107.

In the meantime, the print tape 103 is paid out from the print tape roll 104 and the print head 10 prints desired content on the back surface of the print tape 103. Subsequently, the base tape 101 and the printed print tape 103 introduced into the cassette 100B from the cassette 100A are bonded together between the pressure roller 107 and sub-roller 109, forming the printed label tape 110, and the printed label tape 110 is discharged from the cassette 100B.

As described above, tag memories in the RFD tags TA and TB respectively store cassette information for the corresponding cassettes 100A and 100B. As in FIGS. 10 and 11, the communication sensitivity between the RFID tag TA on the cassette 100A and the antenna 314 is greater than the communication sensitivity between the RFID tag TB on the cassette 100B and the antenna 314. Thus, as described above, the CPU of the control circuit 30 uses this difference in communication sensitivity when the cassettes 100A and 100B are mounted to distinguish whether information acquired by the antenna 314 is cassette information related to the cassette 100A or cassette information related to the cassette 100B.

This variation obtains the same effects as the variation illustrated in FIGS. 10 and 11.

(3) Other Variations

While the print tape 103 or 103' are used as examples of the print medium in the above descriptions, the print medium may be a print tube (a tube-like print medium) configured to be printable, or a normal printing paper having a standard size, such as A4, A3, B4, or B5, for example. The same effects described above can be achieved in these cases.

The use of such terms as "perpendicular," "parallel," and "flat" in the above description are not intended to be taken in their strictest sense. In other words, the terms "perpendicular," "parallel," and "flat" may signify "substantially perpendicular," "substantially parallel," and "substantially flat" to allow for design and manufacturing tolerances and error.

When dimensions and sizes are described as being "identical," "equivalent," or "different" in appearance in the above description, these terms are not intended to be taken in their strictest sense. In other words, the terms "identical," "equivalent," and "different" may signify "substantially identical," "substantially equivalent," and "substantially different" to allow for design and manufacturing tolerances and error. However, when describing values used for prescribed criteria or for a threshold value, such as in the flowcharts of FIGS. 7 and 8, such terms as "identical," "equivalent," and "different" should be taken in their strictest sense.

The arrows in FIG. 2 indicate an example of signal flow in the above description, but the directions of signal flow are not limited to this example.

Further, the flowcharts illustrated in FIGS. 7 and 8 do not limit the present disclosure to the steps indicated therein. Steps may be added or deleted, or their order may be rearranged, without departing from the spirit and technical ideas of the disclosure.

In addition to what has already been described, the methods according to the embodiments and their variations described above may be used in suitable combinations.

In addition, although not illustrated individually, the present disclosure may be implemented with various modifications without departing from the spirit of the disclosure.

What is claimed is:

1. A printing device comprising:
   an RFID reader comprising a reader antenna;
   a cassette mounting portion configured such that a plurality of types of cassettes is capable of being selectively mounted in the cassette mounting portion, each of the plurality of types of cassettes comprising an RFID tag storing therein cassette information related to the cassette, the RFID tag comprising a tag antenna configured to communicate with the reader antenna, wherein communication sensitivity between the reader antenna and the tag antenna when the cassette is mounted in the cassette mounting portion is different for each of the plurality of types of cassettes;
   a memory storing therein correlations between the plurality of types of cassettes and a plurality of standard ranges concerning a return energy received by the RFID reader from the tag antenna;
   a printing portion configured to print on a print medium; and
   a controller configured to perform:
      (a) controlling the printing portion to print;
      (b) communicating via the RFID reader with the RFID tag of the cassette mounted in the cassette mounting portion; and
      (c) determining whether a value of the return energy received by the RFID reader in the (b) communicating falls within any one of the plurality of standard ranges indicated by the correlations.

2. The printing device according to claim 1, wherein a distance between the reader antenna and the tag antenna when the cassette is mounted in the cassette mounting portion is different for each of the plurality of types of cassettes.

3. The printing device according to claim 2, wherein the plurality of types of cassettes has different thickness dimensions from one another.

4. The printing device according to claim 1, wherein an angle of the tag antenna relative to the reader antenna when the cassette is mounted in the cassette mounting portion is different for each of the plurality of types of cassettes.

5. The printing device according to claim 1, wherein the controller is configured to further perform:
   (d) acquiring, by performing the (b) communication, the cassette information from the RFID tag of the cassette mounted in the cassette mounting portion, and
   wherein, when determination that the value of the return energy received in the (b) communicating falls within any one of the plurality of standard ranges is made in the (c) determining, the (a) controlling is performed based on the cassette information acquired in the (d) acquiring.

6. The printing device according to claim 1, further comprising a display,
   wherein the controller is configured to further perform:
      (e) acquiring, by performing the (b) communication, the cassette information from the RFID tag of the cassette mounted in the cassette mounting portion; and
      (f) determining, when determination that the value of the return energy received in the (b) communicating falls within any one of the plurality of standard ranges is made in the (c) determining, whether a first cassette type and a second cassette type match each other, the first cassette type being a type of the cassette mounted in the cassette mounting portion that is identified based on the standard range within which the value of the return energy received in the (b) communicating falls, the second cassette type being a type of the cassette mounted in the cassette mounting portion that is identified based on the cassette information acquired in the (e) acquiring; and
      (g) controlling, when determination that the first cassette type and the second cassette type do not match each other is made in the (f) determining, the display to display an error message thereon,
   wherein, when determination that the first cassette type and the second cassette type match each other is made in the (f) determining, the (a) controlling is performed based on the cassette information acquired in the (e) acquiring.

7. The printing device according to claim 1, further comprising a display,
  wherein the controller is configured to further perform:
    (h) controlling, when determination that the value of the return energy received in the (b) communicating does not fall within any one of the plurality of standard ranges is made in the (c) determining, the display to display an error message thereon.

8. The printing device according to claim 1, further comprising an operating unit on which input operations are capable of being performed,
  wherein the controller is configured to further perform:
    (i) acquiring, by performing the (b) communication, the cassette information from the RFID tag in the cassette mounted in the cassette mounting portion, and
  wherein, when determination that the value of the return energy received in the (b) communicating does not fall within any one of the plurality of standard ranges is made in the (c) determining, the (a) controlling is performed based on the cassette information acquired in the (i) acquiring provided that a prescribed input operation is performed on the operating unit.

9. The printing device according to claim 8, wherein the prescribed input operation is an operation to input a type of the cassette.

10. The printing device according to claim 9, wherein the controller is configured to further perform:
    (j) storing, in the memory, the type of the cassette inputted through the operating unit and the value of the return energy received in the (b) communicating in association with each other.

11. The printing device according to claim 1, wherein the controller is configured to further perform:
    (k) acquiring, by performing the (b) communication, the cassette information from the RFID tag in the cassette mounted in the cassette mounting portion;
    (l) determining, when determination that the value of the return energy received in the (b) communicating does not fall within any one of the plurality of standard ranges is made in the (c) determining, whether a third cassette type and a fourth cassette type match each other, the third cassette type being a type of the cassette mounted in the cassette mounting portion that is identified based on the standard range closest to the value of the return energy received in the (b) communicating, the fourth cassette type being a type of the cassette mounted in the cassette mounting portion that is identified based on the cassette information acquired in the (k) acquiring;
    (m) outputting, when determination that the third cassette type and the fourth cassette type match each other is made in the (l) determining, a remount signal for prompting to remount the cassette mounted in the cassette mounting portion.

12. The printing device according to claim 1, wherein the (c) determining is performed at any one of the following timings:
    a timing that a cover that opens and closes the cassette mounting portion is closed;
    a timing that an external device connected to the printing device begins creating print data to be used for printing by the printing portion; and
    a timing that a print command to instruct printing by the printing portion is received from the external device connected to the printing device.

13. The printing device according to claim 1, further comprising:
    another cassette mounting portion configured such that another cassette different from the plurality of types of cassettes is capable of being mounted in the another cassette mounting portion, the another cassette comprising another RFID tag storing therein another cassette information related to the another cassette, the another RFID tag comprising another tag antenna,
  wherein the reader antenna of the RFID reader is configured to communicate also with the another tag antenna of the another RFID tag.

14. The printing device according to claim 13, wherein the reader antenna is disposed such that the communication sensitivity between the reader antenna and the tag antenna of the RFID tag when the cassette is mounted in the cassette mounting portion is different from communication sensitivity between the reader antenna and the another tag antenna of the another RFID tag when the another cassette is mounted in the another cassette mounting portion.

15. The printing device according to claim 14, wherein the cassette is a medium cassette configured to supply a print medium, and
  wherein the another cassette is a ribbon cassette configured to supply an ink ribbon configured to transfer ink onto the print medium.

16. The printing device according to claim 14, wherein the cassette is a medium cassette configured to supply a print medium, and
  wherein the another cassette is a laminating medium cassette configured to supply a laminating tape configured to be laminated over the print medium.

17. The printing device according to claim 14, wherein the another cassette mounting portion is configured such that a plurality of types of the another cassettes is capable of being selectively mounted in the another cassette mounting portion.

18. The printing device according to claim 13, wherein, in a state where the cassette is mounted in the cassette mounting portion, the reader antenna of the RFID reader and the tag antenna of the RFID tag are arrayed in a prescribed direction, and
  wherein, in a state where the another cassette is mounted in the another cassette mounting portion, the reader antenna of the RFID reader and the another tag antenna of the another RFID tag are arrayed in the prescribed direction.

19. The printing device according to claim 13, wherein, in a state where the cassette is mounted in the cassette mounting portion, the tag antenna of the RFID tag is positioned closer to the another cassette mounting portion than a centerline of the cassette is to the another cassette mounting portion, and
  wherein, in a state where the another cassette is mounted in the another cassette mounting portion, the another tag antenna of the another RFID tag is positioned closer to the cassette mounting portion than a centerline of the another cassette is to the cassette mounting portion.

* * * * *

UNITED STATES PATENT AND TRADEMARK OFFICE
CERTIFICATE OF CORRECTION

PATENT NO. : 11,292,277 B2
APPLICATION NO. : 17/082583
DATED : April 5, 2022
INVENTOR(S) : Hiromitsu Mizutani Page 1 of 1

It is certified that error appears in the above-identified patent and that said Letters Patent is hereby corrected as shown below:

In the Claims

1) Column 18, Line 32, in Claim 5, replace the term "communication" with the term "communicating" immediately after the phrase "performing the (b)"

2) Column 18, Line 44, in Claim 6, replace the term "communication" with the term "communicating" immediately after the phrase "performing the (b)"

3) Column 19, Line 16, in Claim 8, replace the term "communication" with the term "communicating" immediately after the phrase "performing the (b)"

4) Column 19, Line 37, in Claim 11, replace the term "communication" with the term "communicating" immediately after the phrase "performing the (b)"

Signed and Sealed this
Fifteenth Day of November, 2022

Katherine Kelly Vidal
*Director of the United States Patent and Trademark Office*